Patented June 19, 1934

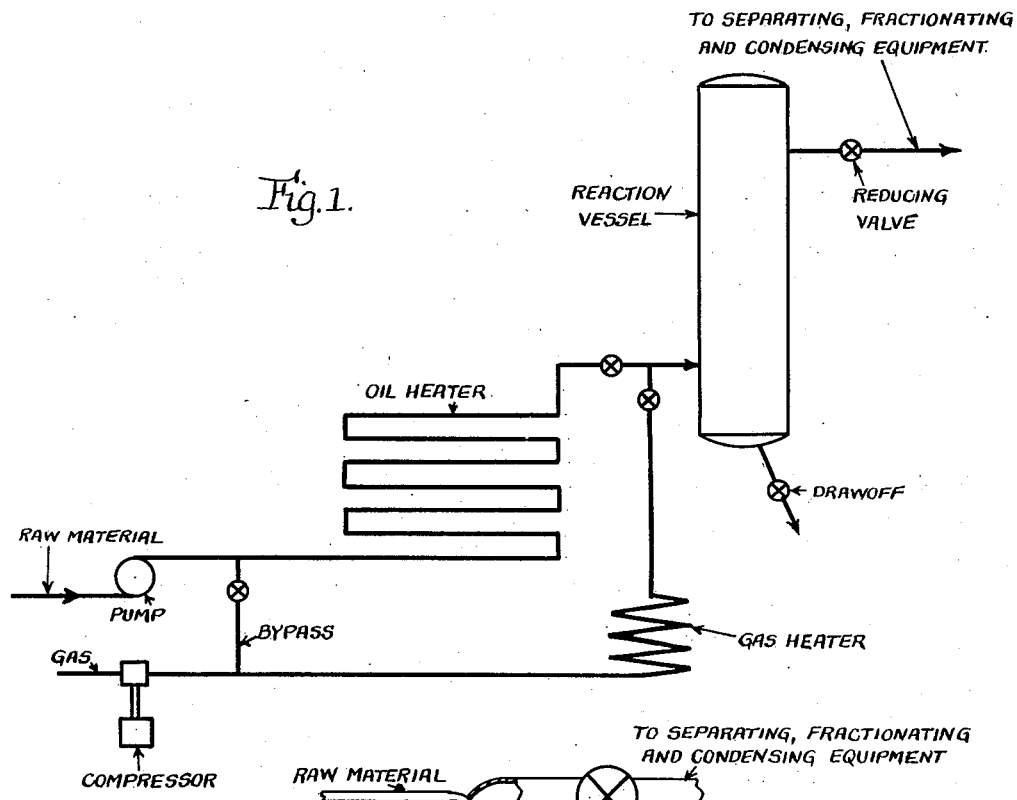
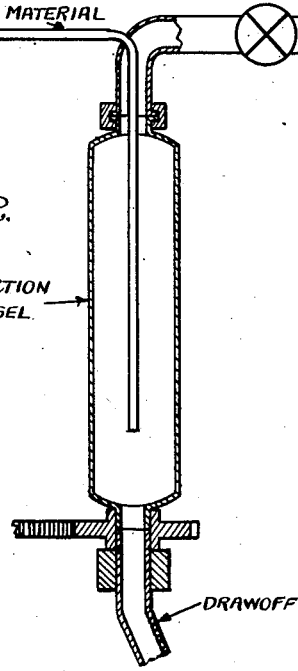

1,963,757

UNITED STATES PATENT OFFICE 1,963,757

PROCESS FOR THE TREATMENT OF HIGH-BOILING HYDROCARBONS

Eduard Moehrle, Duisburg-Meiderich, Germany

Application April 3, 1931, Serial No. 527,614
In Germany June 7, 1930

7 Claims. (Cl. 196—62)

This invention relates to a new and improved process for obtaining valuable products from high-boiling hydrocarbons and more particularly to the treatment of heavy hydrocarbons in an inert atmosphere to produce lighter hydrocarbons.

It has heretofore been general to attempt to convert high-boiling hydrocarbons into benzine without pressure and without the addition of gases, and also processes are being developed wherein high pressures are used with the addition of hydrogen or mixed gases or compound gases containing hydrogen.

The present method uses comparatively high pressures in an atmosphere of inert gases and in one particular example an atmosphere of nitrogen is used.

It is an object of the present invention to provide a method for the treatment of high-boiling hydrocarbons in an inert atmosphere to produce lighter hydrocarbons.

It is a further object to provide a method of this character in which the treatment is in an atmosphere of nitrogen under pressure.

It is a further object to provide a method of treatment in an atmosphere of nitrogen under pressures in excess of fifty atmospheres and at temperatures in excess of three hundred and fifty degrees centigrade.

Other and further objects will appear as the description proceeds.

I have shown diagrammatically in the accompanying drawing, apparatus suitable for carrying out my improved process.

In the drawing—

Figure 1 is a layout of the apparatus; and

Figure 2 is a diagrammatic showing of a rotating vessel which may be substituted for the reaction vessel of Figure 1.

The drawing is substantially self-explanatory in view of the legends thereon.

It will be apparent that the raw material or high boiling hydrocarbons are forced by a pump through an oil heater, such as a pipe still or the like, to the reaction vessel. The gas is compressed and may be added to the hydrocarbons before or after the heating thereof. Means are provided for separately heating the gas if desired. The reaction vessel is provided with connections for leading off the overhead products and for drawing off the residue.

In Figure 2 is shown a form of reaction vessel which may be rotated during the reaction. This vessel may be used in combination with the other apparatus of Figure 1 in substitution for the fixed reaction vessel shown in that figure.

As one specific example of carrying out the present invention, 500 kilograms of gas oil was placed in a rotating vessel under a pressure of 100 atmospheres with nitrogen. The vessel was heated for one hour at a temperature of 460° C., the heat causing the pressure to increase to 340 atmospheres. After cooling the vessel yielded 390 kilograms of liquid products, the remainder being gaseous as no coke is formed under the conditions of the reaction. The liquid products give forty percent of benzine upon fractional distillation, this being strongly anti-knock in character as a result of its high content of aromatic hydrocarbons. The liquid products also included twenty-three percent of unchanged gas oil and about eight percent of valuable lubricating oil.

It was found that in the treatment of high-boiling hydrocarbons under temperatures and pressures of the character described, the quality of the benzine produced is much better when the hydrocarbons are under pressure of nitrogen than when the hydrocarbons are treated by usual cracking processes. Instead of nitrogen an inert gas may be used, an inert gas being one which does not appreciably enter into the reaction. The hydrogen split off in cracking is transferred to the benzine resulting from the cracking and to the high boiling reaction products formed by polymerization to a greater extent under pressure of nitrogen or inert gases than without the application of these gases under pressure. If the reaction is conducted with the assistance of these gases under pressure and with the further assistance of catalysts, the valuable results are further increased. The halogen compounds, especially iodine, or iodine compounds from which iodine is obtained directly or indirectly under the conditions of the reaction, are particularly suitable as catalysts.

The catalysts are used in small quantities, such as less than one percent of the material being treated, and preferably a small fraction of one percent. The vessel may be formed of any materials designed to withstand the high pressures and temperatures used in the process. As an example of such a material a chromium, nickel, alloy steel may be mentioned. The conditions under which the reaction take place determine the type of material out of which the vessel is to be constructed, rather than any catalytic activity which may be expected from the surface of the vessel.

While one specific example of carrying out the method has been given, this is to be understood as illustrative only, as the method may be used with other heavy hydrocarbons, with other catalysts and under such various conditions as to temperature and pressure as may come within the spirit and scope of the appended claims.

I claim:

1. A process for the conversion of heavy hydrocarbons with limited formation of free hydrogen, which comprises bringing together the hydrocarbons and only an inert gas which does not enter into the reaction appreciably, and treating the mixture at a temperature in excess of 350° C. and at a pressure of the order of three hundred atmospheres, the inert gas being a substantial portion of the gaseous material present during the treatment.

2. A process for the conversion of heavy hydrocarbons with limited formation of free hydrogen, which comprises bringing together the hydrocarbons and only nitrogen, and treating the mixture at a temperature in excess of 350° C., and at a pressure of the order of three hundred atmospheres, the nitrogen being a substantial portion of the gaseous material present during the treatment.

3. A process for the conversion of heavy hydrocarbons with limited formation of free hydrogen, which comprises bringing together the hydrocarbons and only an inert gas which does not enter into the reaction appreciably and treating the mixture at a temperature of the order of 460° C., and at a pressure of the order of three hundred atmospheres, the inert gas being a substantial portion of the gaseous material present during the treatment.

4. A process for the conversion of heavy hydrocarbons with limited formation of free hydrogen, which comprises bringing together the hydrocarbons and only an inert gas which does not enter into the reaction appreciably and treating the mixture in the presence of elemental iodine at a temperature in excess of 350° C., and at a pressure of the order of three hundred atmospheres, the inert gas being a substantial portion of the gaseous material present during the treatment.

5. A process for the conversion of heavy hydrocarbons with limited formation of free hydrogen, which comprises bringing together the hydrocarbons and only nitrogen and treating the mixture in the presence of elemental iodine at a temperature in excess of 350° C., and at a pressure of the order of three hundred atmospheres, the nitrogen being a substantial portion of the gaseous material present during the treatment.

6. A process for the conversion of heavy hydrocarbons with limited formation of free hydrogen, which comprises bringing together the hydrocarbons and only an inert gas which does not enter into the reaction appreciably and treating the mixture in the presence of a halogen having the effect of elemental iodine at a temperature in excess of 350° C., and at a pressure of the order of three hundred atmospheres, the inert gas being a substantial portion of the gaseous material present during the treatment.

7. A process for the conversion of heavy hydrocarbons with limited formation of free hydrogen, which comprises bringing together the hydrocarbons and only nitrogen and treating the mixture in the presence of a halogen having the effect of elemental iodine at a temperature in excess of 350° C., and at a pressure of the order of three hundred atmospheres, the nitrogen being a substantial portion of the gaseous material present during the treatment.

EDUARD MOEHRLE.